Aug. 2, 1960

K. FARRER 2,947,266

APPARATUS FOR MAKING WAFER SANDWICHES

Filed March 27, 1956

INVENTOR
KENNETH FARRER

By Watson, Cole, Grindle, & Watson
ATTORNEYS

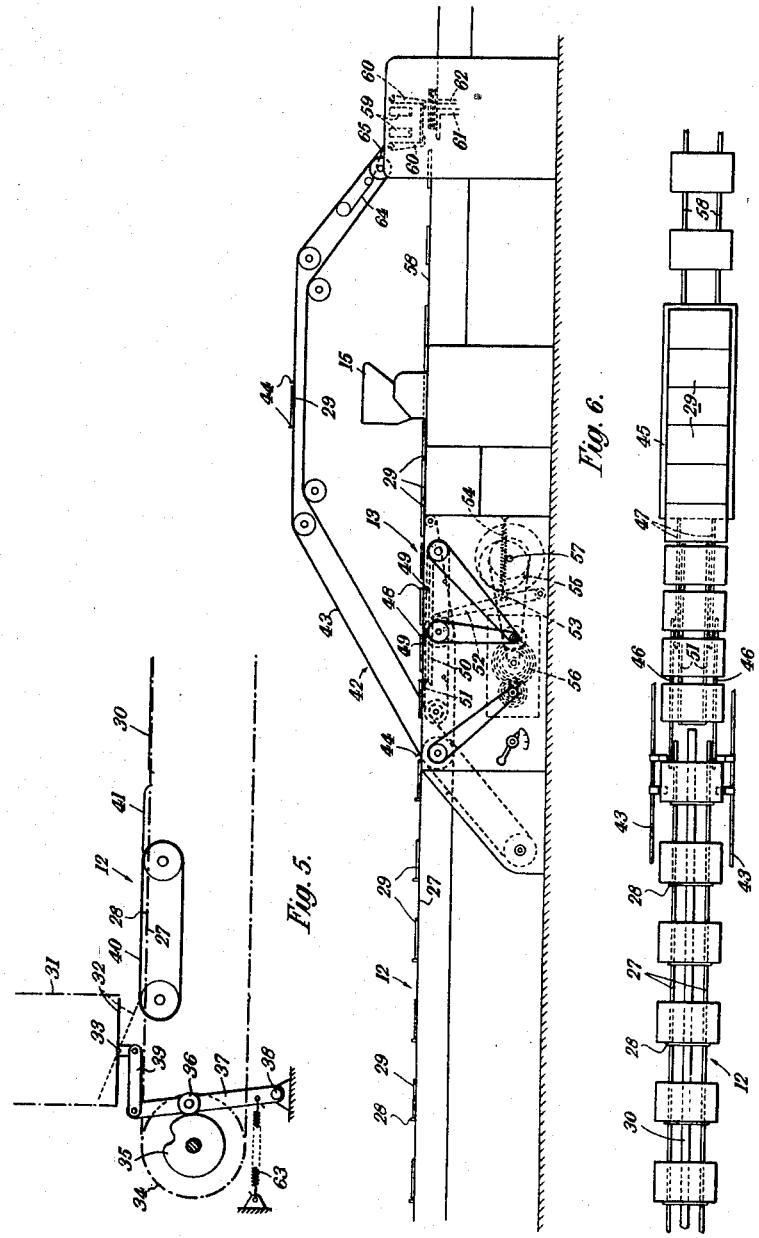

United States Patent Office 2,947,266
Patented Aug. 2, 1960

2,947,266
APPARATUS FOR MAKING WAFER SANDWICHES

Kenneth Farrer, Peterborough, Northants, England, assignor to Baker Perkins Limited, Peterborough, England, a company of Great Britain Filed Mar. 27, 1956, Ser. No. 574,158

Claims priority, application Great Britain Mar. 29, 1955

6 Claims. (Cl. 107—1)

The normal practice in the manufacture of wafer sandwiches is to stack the wafer sheets produced by a wafer baking machine, to cool them if required, and then to transport them to a spreading machine. In this, the wafer sheets are placed manually in close abutment on a conveyor which traverses the sheets beneath a device for applying to their upper surfaces a layer of cream or other sandwich filling such as for instance caramel, chocolate or jam. The emerging creamed sheets are then made up manually into sandwich blocks, each including one dry, i.e. uncreamed, wafer sheet. The sandwich blocks are then stacked, subjected to pressure and, after cooling, taken to a cutting machine which severs the blocks both longitudinally and transversely into wafer sandwiches of the required size.

This procedure involves the use of a considerable amount of labour in handling the wafer sheets and sandwich blocks and the object of this invention is to provide for automatic transfer of the wafer sheets from the baking machine to and through cream spreading, sandwiching and cutting machines, and such that during normal operation of the machines no handling of the wafer sheets is necessary until the sandwiches emerge ready for packing. Indeed, in suitable cases arrangements may be made for direct transfer of the finished sandwiches to a packing machine.

It has been proposed to produce continuous wafer sheets in a baking machine and to feed two such sheets in superposition, with an interposed layer of cream, between sandwiching rollers and on to a cutting apparatus. So far, however, as I am aware wafer sandwiches have not hitherto been produced commercially by this method and my invention is not concerned with continuously produced wafer sheets but relates solely to the automatic production of wafer sandwiches from individually baked wafer sheets of the sizes commonly produced by known wafer baking machines, e.g. that described in British Patent No. 702,563, dated January 20, 1954.

The invention provides apparatus for the manufacture of wafer sandwiches comprising a wafer baking machine, a conveyor for feeding forward the wafer sheets produced by the baking machine, a selecting device for removing every $n$th sheet from the procession of sheets on the conveyor and feeding the extracted sheets in a continuous procession to a sandwiching machine ($n$ being a small whole number exceeding unity), means for marshalling the sheets remaining on the conveyor and passing them in close abutment through a spreading machine, whereby said remaining sheets receive a layer of cream or the like, a further conveyor for transferring the creamed sheets from the spreading machine to a sandwiching machine, said sandwiching machine accepting in succession $n-1$ creamed sheets from the procession on said further conveyor and forming them into a sandwich block with a single dry sheet supplied to the sandwiching machine from the selecting device, and a cutting machine for receiving the sandwich blocks and serving to cut the blocks longitudinally and transversely into wafer sandwiches.

Normally wafer sandwiches consist of 2, 3, 4, 5 or occasionally more sheets. The number $n$ will accordingly be 2, 3, 4, 5 or more, the selecting device extracting every other wafer from the procession of sheets on the first conveyor in the case of a 2-wafer sandwich, every third wafer in the case of a 3-wafer sandwich and so on. Preferably the selecting device and the sandwiching machine are adjustable so that the apparatus can be utilized as required to produce sandwiches consisting of 2, 3, 4, 5 or more sheets as desired.

Preferably a conveyor system is provided for feeding the sandwich blocks continuously from the sandwiching machine to the cutting machine. As noted later, however, it may in some cases be desired to dispose the cutting machine, and other machinery to which the wafer sandwiches are fed from the cutting machine, at a level different from that of the rest of the plant. In this case the sandwich blocks may be fed manually to a transporter for carrying them to the different level and afterwards fed manually from the transporter to a conveyor leading to the cutting machine. Alternatively, an automatic transporter may be used for conveying the sandwich blocks from the one level to the other.

Certain specific embodiments of the invention will now be described in more detail, by way of example, with reference to the accompanying drawings in which.

Figure 3:
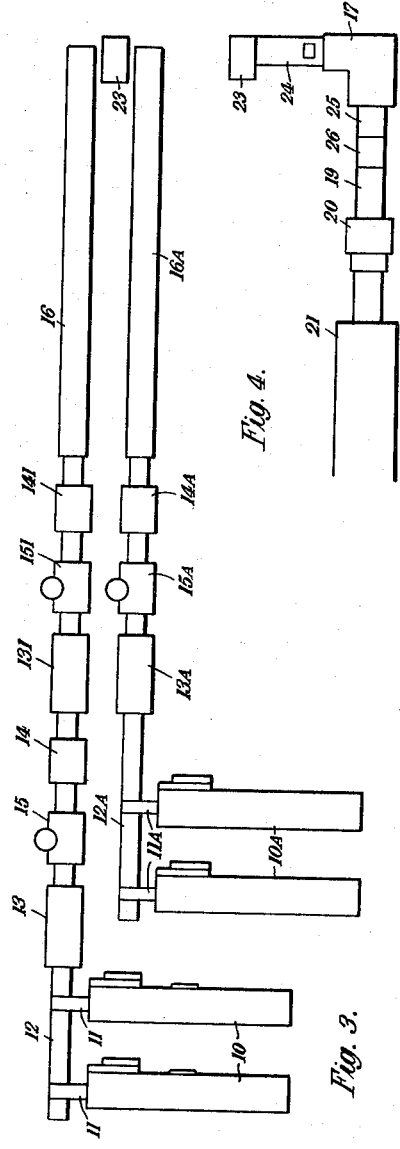
Figure 4:
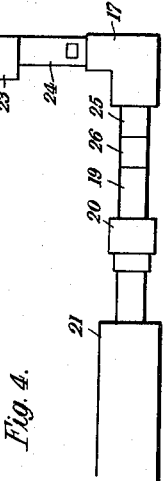

Fig. 3 is a plan view of the plant installed in the wafer room in the case of another form of apparatus according to the invention, Fig. 4 is a plan view of the remainder of the plant, installed in an enrobing room at a higher level, to which sandwich blocks are transferred from the plant shown in Fig. 3, Fig. 5 is a diagrammatic side elevation illustrating the transfer of wafer sheets from the baking machine to a receiving conveyor, Fig. 6 is a side elevation illustrating the selecting and marshalling units and the spreading and sandwiching machines, and Fig. 7 is a corresponding plan view.

Like reference numerals indicate like parts throughout the figures.

Figure 1:
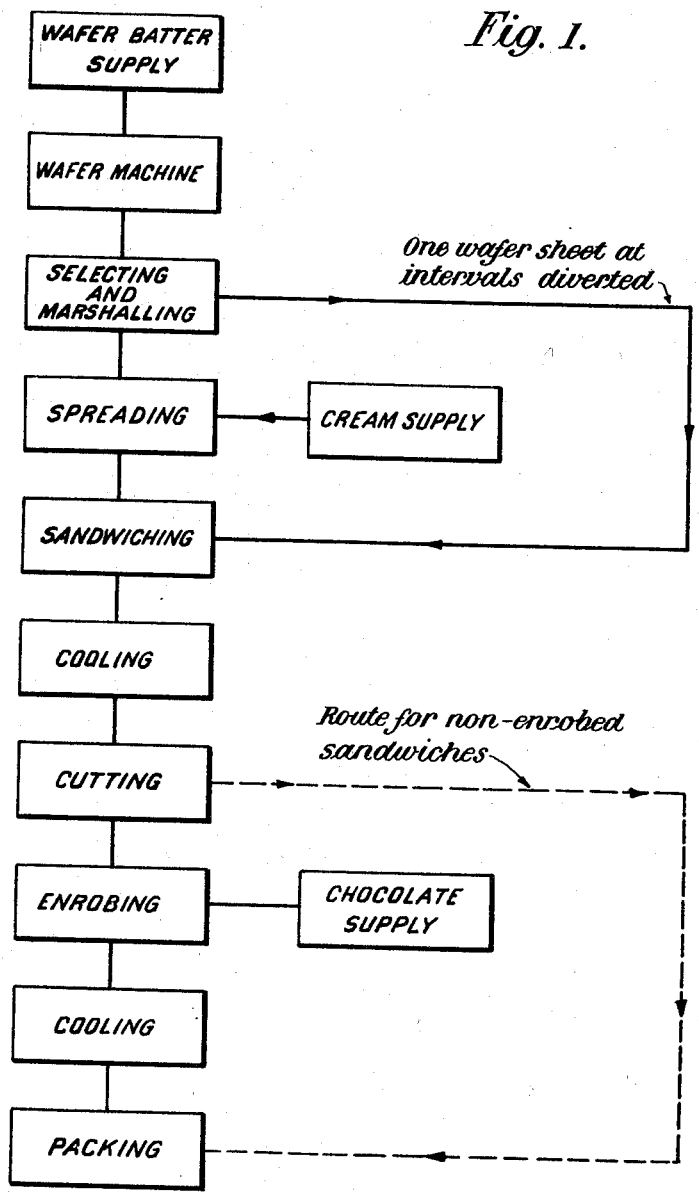
Fig. 1 is a flow sheet.

Reference will first be made to the flow sheet shown in Fig. 1, which may be explained as follows:

(1) A wafer baking machine converts batter into cooked wafer sheets between heated plates. The wafers may be discharged by means of an air jet (as described in British Patent No. 702,563, dated January 20, 1954) and from the delivery chute they pass into the pockets of a chain conveyor. (If more than one wafer baking machine is required, they would either have a common drive for synchronization or failing this a certain amount of spacing would be done by hand.)

(2) The selecting and marshalling unit is set, according to the number of wafers required in the finished sandwich, to divert one sheet from each predetermined number, and to close up the remainder. The diverted wafer sheet by-passes the spreading machine, and passes to the sandwiching machine.

(3) The feed to the spreading machine has no gaps between wafer sheets. The spreading machine is therefore able to work continuously, with no complicated equipment for timing or cut-off.

(4) The sandwiching machine places a predetermined number of creamed sheets on top of each other together with the dry sheet which by-passed the spreading machine. The pile is then discharged as a wafer sandwich block. The selecting unit and sandwiching machine can be set to produce blocks having 2 to 5 layers of wafer (1 to 4 cream layers).

(5) A cooler is provided, if necessary, to harden the cream layers. This is not necessary when the cream used will set without cooling.

(6) In the cutting unit the blocks are cut laterally and longitudinally into the required size, by means of knives, wires or saws. After cutting, the products can pass directly to the packing section (9) if non-enrobed wafer sandwiches are required. If, however, they are to be chocolate coated they will pass through an enrober and cooler. Before enrobing, the wafer sandwiches must be arranged with lateral and longitudinal spacing to enable the chocolate to cover all faces and to avoid sticking. Coming from the cutting machine the wafer sandwiches are close-spaced (the knives or saws being only about .020" thick) with gaps where the original blocks ended. For a tunnel type cooler they must be closed up longitudinally then spaced out evenly both laterally and longitudinally. When a circuitous type cooler is used they must additionally be batched into tray loads with the necessary gaps between batches.

(7) It is proposed to use a standard enrober which has a nominal width of 32". The sandwich blocks are therefore conveniently fed to the cutting unit in their lengthwise direction so that, their width being about 11½", it is convenient to use a cutting machine which transforms one line into two so that the wafer sandwiches, with the gaps between them, will occupy the full enrober and cooler width.

(8) Cooler for setting the chocolate.

(9) Packing section.

The apparatus according to the invention thus includes a number of units with conveyors between the various units. It has the advantage of saving space and labour, providing maximum hygiene, giving a constant output of sandwiches in perfect condition and avoiding bottlenecks. It also permits of flexibility of layout to cater for installation in existing buildings of various shapes. Thus, in addition to a straight-line arrangement it is possible, by the use of suitable inter-unit conveyors, to arrange the plant in, for example, L or U formation, and by the use of elevators to disposed parts of the plant on different floors.

Figure 2:
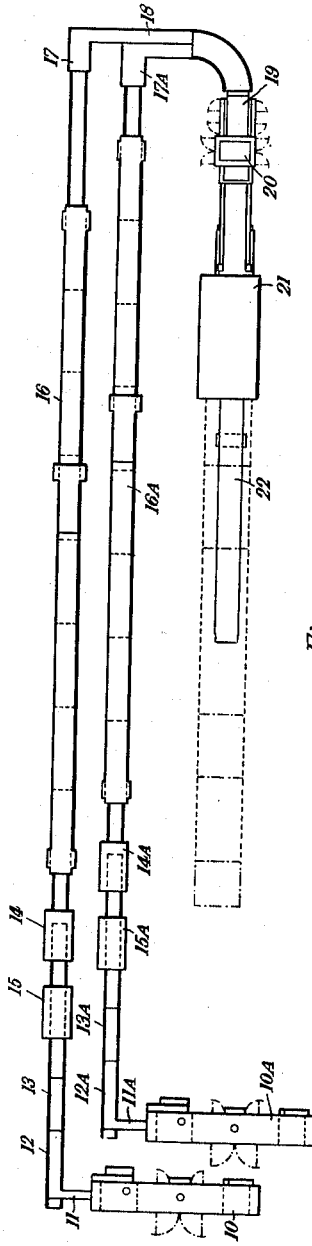
Fig. 2 is a plan view of one form of apparatus according to the invention.

Turning now to Fig. 2, it will be seen that the plant there illustrated includes two wafer baking machines 10, 10A which deliver wafer sheets down chutes 11, 11A to receiving conveyors 12, 12A. The wafer sheets are then fed to selecting and marshalling units 13, 13A. These operate, as described later, to extract dry wafer sheets at intervals from the processions on the respective conveyors 12, 12A; to convey the extracted dry wafer sheets in succession to sandwiching machines 14, 14A and to close up the remaining sheets and pass them in close abutment through cream spreading machines 15, 15A and thence to the sandwiching machines 14, 14A. The sandwich blocks are conveyed from the sandwiching machines 14, 14A through cooling tunnels 16, 16A to cutting machines 17, 17A of known type which cut the sandwich blocks both longitudinally and transversely into wafer sandwiches. The two columns of wafer sandwiches are carried from the cutting machines by a conveyor 18 to a batching machine 19 and thence to an enrober 20 and through a circuitous cooler 21 to a packing conveyor 22.

In the plant shown in Fig. 3, there are again two production lines, but in this case each of the collecting conveyors 12, 12A is fed by two wafer baking machines 10, 10A respectively, as shown. In addition, the upper production line is modified, as later explained, to produce caramel wafer sandwiches. The sandwich blocks are fed manually from the cooler 16, 16A to an elevator 23 for carrying them to an enrobing room at a higher level which contains the plant shown in Fig. 4. The sandwich blocks are fed manually from the elevator 23 on to a conveyor 24 which carries them to the cutting machine 17, whence the wafer sandwiches pass to a bunching conveyor 25, then to a conveyor 26 which spreads them lengthways, then to the batcher 19 and finally to the enrober 20. As previously mentioned the elevator 23 may be arranged to transfer the sandwich blocks automatically from the lower to the higher level.

As shown in Figs. 5-7, the receiving conveyor 12 comprises a pair of chains 27, carrying a series of equally spaced pushers 28 which push the wafer sheets 29 forwards in a regularly spaced procession along a fixed skid 30, the ends of the wafer sheets 29 projecting beyond the chains 27 as shown in Fig. 7. The chute 11 (Fig. 2) leading from the wafer baking machine deposits the wafer sheets in succession and one at a time into a collecting box 31 (Fig. 5), the base of which is constituted by a tray 32 hinged on a transverse axis 33. A cam 35, which rotates with the sprocket 34 of the collecting conveyor, coacts with a follower 36 on a lever 37, mounted on a fixed pivot 38 and connected by a link 39 to the tray 32. A spring 63 holds the follower 36 in contact with the cam 35 which periodically rocks the tray 32 about its hinge 33, into the position shown in chain-dotted lines, causing it to deliver a wafer sheet from the bottom of the box 31. The wafer sheet so deposited is fed by a pair of V belts 40 onto a pair of parallel fixed skids 41, whence the wafer sheet is picked up by one of the pushers 28 of the receiving conveyor.

The receiving conveyor thus feeds a uniformly spaced procession of wafer sheets along a horizontal path to a selecting station where every nth sheet is removed from the procession by a selecting conveyor 42 (Fig. 6), the remaining sheets passing on via the marshalling apparatus 13 to the spreading machine 15. If it is desired to cool the sheets, or condition them (e.g. by passage through a humid atmosphere) before spreading, the conveyor 12 can be arranged to traverse them through a cooling or conditioning chamber. Alternatively the sheets can be cooled and/or conditioned after they have passed the selecting station.

The selecting conveyor 42 comprises a pair of chains 43 disposed outside the chains 27 of the receiving conveyor in an upwardly inclined path, both conveyors travelling at the same speed, i.e. 40 ft. per minute. The chains 43 of the selecting conveyor carry adjustable fingers 44 for engaging the ends of wafer sheets on the receiving conveyor and diverting them from the procession thereon. The fingers 44 may be selectively moved inwards to cause the selecting conveyor to divert every other sheet from the receiving conveyor in the case when a two-wafer sandwich is to be made, every third sheet in the case of a three-wafer sandwich and so on.

The dimension of the sheets in the lengthwise direction of the receiving conveyor being approximately 11½", the spacing of the non-selected sheets beyond the selecting station will be approximately as follows:

2-wafer sandwich—sheets uniformly spaced, at 48" pitch.
3-wafer sandwich—2 sheets at 24" pitch followed by a sheet at 48" pitch.
4-wafer sandwich—3 sheets at 24" pitch followed by a sheet at 48" pitch.
5-wafer sandwich—4 sheets at 24" pitch followed by a sheet at 48" pitch.

The marshalling unit 13 has to accommodate this irregular spacing of the sheets remaining on the receiving conveyor 12 and to close them up into close abutment as they pass on to a band 45 which feeds them through the spreading machine 15. The sheets moreover require to be traversed through the spreading machine more rapidly in the case of a 5-wafer sandwich, where 4 sheets of each 5 produced by the baking machine have to be creamed, then in the case of a 4-wafer sandwich, more slowly in the case of a 3-wafer sandwich and still more slowly in the case of a 2-wafer sandwich.

The marshalling unit has two pairs of horizontally travelling bands (referred to as marshalling and transfer bands respectively), the sheets being transferred in succession from the receiving conveyor to the marshalling bands 46. The spacing of the sheets is rendered uniform, the pitch being reduced to 13.8", just before they pass to the transfer bands 47, which move more slowly than the marshalling bands 46.

Apart from any variation in the speed of the whole apparatus, the marshalling bands 46 have a single speed but the transfer bands 47 have four speeds according to the different types of sandwich:

2-wafer sandwich 11.5 ft./min.
3-wafer sandwich 15.33 ft./min.
4-wafer sandwich 17.25 ft./min.
5-wafer sandwich 18.4 ft./min.

This uniform spacing of the sheets is effected by a conveyor, the upper run of which is below the level of the upper run of and travels in the same direction as the marshalling bands 46, comprising a pair of chains 51 carrying pegs 48 which are periodically raised into the path of the sheets to retard them. The pegs 48, which are pitched 13.8" apart, are normally down but carry rollers 49 which coact with a movable cam bar 50 to raise the pegs 48 to their operative position. These marshalling chains 51 are driven at the same speed as the transfer bands 47, and the cam bar 50 is periodically moved towards the oncoming procession of sheets and then rapidly back again, as more fully described in my U.S. application Serial No. 574,113, filed March 27, 1956, now U.S. Patent No. 2,884,115 dated April 28, 1959 by a lever 52 carrying a follower 53 which is maintained by a spring 54 in contact with one of a series of cams 55. A series of alternative cams is provided for coaction with the cam bar 50 to give it different movements according to the make-up of the wafer sandwich.

In the case of the 2-wafer sandwich, the cam bar 50 occupies a fixed position, herein termed station 1, and raises the pegs 48 at this position to retard the sheets 29, the pegs remaining up beyond this station until the sheets have moved on to the transfer bands. The pegs retard the sheets in succession, coming up in the gaps and reducing the pitch of the sheets to 13.8".

In the case of the 3-wafer sandwich, the cam bar 50 is periodically moved forwards to a second station and then back to the first station, the pegs 48 coming up in the long gaps at the first station and in the short gaps at the second station. In the case of a 4-wafer sandwich, the cam bar moves forward to 2nd and 3rd stations, the pegs coming up in the long gaps at the first station, in the first short gap at the second station and in the second short gap at the third station. In the case of a 5-wafer sandwich, the cam bar moves forward to a fourth station, the pegs again coming up in the long gaps at the first station and in the three short gaps at the second, third and fourth stations respectively.

To adjust the marshalling unit to suit the various make-ups of sandwich, the operator merely has—(a) to adjust the fingers on the selecting conveyor, (b) to adjust, by means of a change-speed gear box 56, the speeds of the cam shaft, the marshalling chains and the transfer bands, (c) to select, by axial movement of the cam shaft 57, the appropriate cam 55 for coaction with the cam bar 50.

The cam shaft 57 is driven from the gear box 56 at different speeds for the four different types of sandwich appropriate to ensure travel of the cam bar at the speeds necessary to raise the pegs at the proper stations.

As an alternative to using movable pegs, the marshalling chains may have pegs which project permanently from their upper run, and the cam shaft may be arranged to control the position of jockey pulleys which lift a variable portion of the upper run of the chains into a position such that the pegs are effective to retard the sheets.

To close up completely the procession of sheets as they pass from the transfer bands 47 on to the band 45 of the spreading machine, this spreader band 45 moves appropriately more slowly than the transfer bands 47. The spreading machine 15, which is of conventional design, receives its drive from the drive to the transfer bands so that its band keeps in step with the four speeds of the transfer bands. A variable speed gear is incorporated for fine adjustment of the spreader band speed.

The speeds of the spreader band corresponding to those of the transfer bands given previously are:

2-wafer sandwich 9.58 ft./min.
3-wafer sandwich 12.77 ft./min.
4-wafer sandwich 14.37 ft./min.
5-wafer sandwich 15.33 ft./min.

After leaving the spreading machine the sheets pass on to faster moving conveyor bands 58 which space them out and ensure by means of retarding or advancing fingers a regular pitch feed to the sandwiching machine 14. This, as more fully explained in my U.S. Application Serial No. 574,197, filed March 27, 1956, now U.S. Patent No. 2,838,010 dated June 10, 1958, comprises dry wafer fingers 59 for receiving dry wafer sheets from a descending section of the selecting conveyor 42, support fingers 60 disposed beneath the dry wafer fingers 59, a vertically reciprocating table 61 and a stop 62. The dry wafer sheets are guided into the dry wafer fingers 59 from the descending section of the conveyor 42 by a band 64 and a nose piece 65 over which the band 64 runs. A set of cams on a main cam shaft opens and closes the supporting fingers 60, raises and lowers the table 61 and raises and lowers the stop 63. A set of cams on an indexing shaft serves to open and close the dry wafer fingers 59 and to hold off until required the movement of the table 61 and the stop 62 which would otherwise be imparted by the main cam shaft.

The operation of the sandwiching machine will be described with reference to the formation of a four-wafer sandwich block. The indexing shaft in this case performs one revolution for every three revolutions of the main cam shaft. To adjust the machine to suit other types of sandwich, the gear ratio between the two shafts only needs to be altered, the gear ratio being 1/1 for a 2-wafer sandwich, 1/2 for a 3-wafer sandwich, 1/3 for a 4-wafer sandwich and 1/4 for a 5-wafer sandwich.

As a creamed wafer sheet is fed into position above the table 61 against the stop 62, a dry wafer sheet has fallen from the dry wafer fingers 59 on to the support fingers 60 as indicated in Fig. 6. The latter then move out to allow the dry sheet to fall on to the creamed sheet. The two sheets are then raised by the table 61 and the support fingers 60 move in to support them, the table 61 moving down again to receive the next creamed sheet. This cycle of operations is repeated, with the result that three sheets then rest on the support fingers 60. When the table 61 has descended, and the support fingers 60 have opened and allowed the three-wafer sandwich block to fall on to the third creamed sheet on the conveyor bands 58, the stop 62 is moved down to allow the completed four-wafer sandwich block to be carried away by the bands 58 after which the stop is raised again. A dry wafer sheet has, meantime, been collected by the dry wafer fingers 59 and dropped on to the support fingers 60.

The dry wafer sheet is thus on top of the sandwich, and the make up of the sandwich is controlled by the number of up strokes allowed to the table 61 before the stop 62 is removed to allow the sandwich block to travel on. This is determined by the speed ratio of the indexing shaft.

After leaving the sandwiching machine 14, the sandwich blocks are carried by the belts 58 beneath a pressure unit (not shown, but described in my U.S. Patent No. 2,838,010), by which spring pressure is applied to compress the blocks, and then through the cooling tunnel 16.

The cutting machine may be of any conventional type, but it is preferably of the construction described in my U.S. application Serial No. 574,895, filed March 27, 1956, now U.S. Patent No. 2,917,009 dated December 15, 1959, comprising a first pusher which pushes the sandwich blocks alternately to left and right through cutter blades, saws or wires, which cut the blocks in a direction transverse to the conveyor which feeds them into the cutting machine, and a pair of second pushers. These move the severed blocks through further cutter blades, saws or wires, to cut them in the other direction, and on to a pair of dead plates from which they pass to parallel conveyors.

The wafer sandwiches thus travel in two feed columns, in relatively staggered groups, from the cutting machine. The space between the sandwiches after cutting is only about .02" and it would be difficult to separate them laterally by wedge-shaped guides. The following apparatus may therefore be used, likewise as described in my U.S. Patent No. 2,917,009 for effecting lateral separation of the sandwiches and bringing the two feed columns together before passage of the sandwiches to the enrober.

Alternate lines of sandwiches in each column pass below deflectors which deflect them downwardly so that they follow narrow conveyors which proceed to a lower level than that of similar narrow conveyors which carry the other lines of sandwiches. The non-deflected lines in each column and the deflected lines then pass on to intermediate wide conveyors extending for the whole width of the machine and converging upwardly to a common level. During their travel on these intermediate conveyors, the sandwiches pass between guides which provide the required lateral separation between the lines and also lateral convergence of the two columns. All the lines of sandwiches from both columns, still in their respective groups longitudinally but now uniformly spaced laterally, are delivered by the intermediate conveyors to a common wide conveyor leading to the enrober 20.

If the enrober is followed by a cooling tunnel along which the enrobed sandwiches pass in a single plane, it is only necessary to provide for the closing up of the longitudinal gaps between the spaced groups of wafer sandwiches and then to transfer the sandwiches to a faster conveyor which separates them longitudinally before they reach the enrober.

Where, however, the enrober delivers the enrobed sandwiches on to plaques suitable for use in a circuitous cooler and the quantity of sandwiches required per plaque is an integral number of pairs of groups, the columns of groups on the two halves of the conveyor are aligned by periodically arresting the columns by suitable stops to bring them into step laterally, and the wafer sandwiches are spaced longitudinally by feeding them to a faster conveyor which leads to the enrober.

If the plaque quantity is not an integral number of pairs of groups, the sandwiches are dealt with, so far as longitudinal spacing is concerned, by the method described for use with the tunnel type cooler, and are then batched before passing to the enrober. The batcher, indicated at 19 in Fig. 2, may be of the construction described in my U.S. Patent No. 2,917,009. Alternatively it may comprise a lifting plate, disposed between the faster conveyor and a conveyor leading to the enrober, which is periodically lifted by a cam to cause the leading wafer sandwiches to be arrested by a stop. The following wafer sandwiches close up behind the lifted plate which is then lowered to allow the batch of arrested wafer sandwiches to pass on to the enrober.

The conveyor leading to the enrober travels faster than the batcher conveyor so as to space out longitudinally to a sufficient extent the wafer sandwiches closed up in batches by the action of the batcher.

Provision is made for appropriate synchronisation of the constituent units of the plant.

If it is desired to make caramel wafer sandwiches, the plant may include multiple spreaders. Thus, as indicated in the upper production line in Fig. 3, the sandwich blocks produced by the passage of the wafer sheets through the selecting and marshalling unit 13, the cream spreader 15 and the sandwiching machine 14 as described above, may be passed through a second selecting and marshalling unit 131, a second spreader 151 for applying a coating of caramel to the sandwich blocks and a second sandwiching machine 141. Thus in one example, the first unit 13 selects alternate sheets as usual for a two-wafer sandwich, the remainder being spread with cream. The first sandwiching machine 14 puts the dry wafers on, to complete a 2-wafer cream sandwich. The second unit 131 selects alternate cream sandwiches, the remainder being spread with caramel. Finally the second sandwiching machine 141 puts the selected cream sandwiches on. Thus the final 4-wafer sandwich is—wafer–cream–wafer–caramel–wafer–cream–wafer. Multiple spreaders may also be used for spreading two or more kinds or colours of cream or of other coating materials on the wafer sheets.

What I claim as my invention and desire to secure by Letters Patent is:

1. In apparatus for the manufacture of wafer sandwiches, the combination of a spreading machine, a feed conveyor for feeding dry wafer sheets in a regularly spaced procession towards said spreading machine, a sandwiching machine, a continuously travelling selecting conveyor moving in a path intersecting said feed conveyor and including means for extracting from said procession before arrival of the sheets at the spreading machine every $n$th sheet ($n$ being a small whole number exceeding unity), said selecting conveyor feeding said extracted sheets in succession to said sandwiching machine, means for marshalling the sheets remaining on the feed conveyor and passing them in close abutment through said spreading machine, whereby said remaining sheets receive a layer of cream, and a further conveyor for transferring the creamed remaining sheets in succession from the spreading machine to the sandwiching machine, said sandwiching machine comprising means operating in timed relationship with said selecting conveyor and including means for accepting in succession $n-1$ creamed sheets from said further conveyor and forming said accepted sheets into a pile with their creamed surfaces uppermost and means for placing on top of the pile a single dry sheet supplied to the sandwiching machine by the selecting conveyor.

2. In apparatus for the manufacture of wafer sandwiches the combination, with conveyor means for feeding dry wafer sheets in a regularly spaced procession to a spreading machine, of a sandwiching machine, a selecting conveyor for removing every $n$th sheet from said procession ($n$ being a small whole number exceeding unity) and feeding said extracted sheets in succession to said sandwiching machine, marshalling means including pegs co-operating with the sheets remaining on said conveyor means to retard them individually for marshalling said remaining sheets so that they pass in close abutment through said spreading machine, whereby said remaining sheets receive a layer of cream, and a further conveyor for transferring the creamed remaining sheets in succession from the spreading machine to the sandwiching machine, said sandwiching machine comprising means operating in timed relationship with said selecting conveyor and including means for accepting in succession $n-1$ creamed sheets from said further conveyor and forming said accepted sheets into a pile with their creamed surfaces uppermost and means for placing on top of the pile a single dry sheet supplied to the sandwiching machine by the selecting conveyor.

3. In apparatus for the manufacture of wafer sandwiches, the combination with a spreading machine of a conveyor for feeding dry wafer sheets in a regularly spaced procession towards said spreading machine, a sandwiching machine, a selecting device for extracting sheets at regular intervals from said procession, means for marshalling the sheets remaining on the conveyor and passing them in close abutment through said spreading machine, whereby said remaining sheets receive a layer of cream, and a further conveyor for transferring the creamed remaining sheets in succession from the spreading machine to the sandwiching machine, said sandwiching machine comprising means operating in timed relationship with said selecting device for receiving a plurality of creamed sheets from said further conveyor and forming said creamed sheets into a pile, and means also operating in timed relationship with said selecting device for applying to the top of the pile a single dry sheet supplied to the sandwiching machine from the selecting device.

4. In apparatus for the manufacturing of wafer sandwiches the combination with a spreading machine of a conveyor for feeding dry wafer sheets in a regularly spaced procession towards said spreading machine, a sandwiching machine, a selecting device for extracting sheets at regular intervals from said procession, means for marshalling the sheets remaining on the conveyor and passing them in close abutment through said spreading machine whereby said remaining sheets receive a layer of cream, and a further conveyor for transferring the creamed remaining sheets in succession from the spreading machine to the sandwiching machine, said sandwiching machine comprising a stop movable periodically into and out of the path of the creamed sheets on said further conveyor to arrest said creamed sheets, means for displacing said arrested creamed sheets in succession from the further conveyor and forming them into a pile, means for applying to the top of the pile a single dry sheet supplied to the sandwiching machine from the selecting device, and means operating said stop, said displacing means and said applying means operating in timed relationship with said selecting device.

5. In apparatus for the manufacture of wafer sandwiches, the combination of a wafer sandwiching machine, means for feeding a spaced procession of individually baked dry wafer sheets to said sandwiching machine, means for feeding a spaced procession of creamed individually baked wafer sheets to said sandwiching machine, said sandwiching machine including means for forming in succession individual sandwich blocks each consisting of one dry wafer sheet and at least one creamed wafer sheet, a cutting device for cutting the sandwich blocks both longitudinally and transversely into wafer sandwiches, a conveyor for feeding the sandwich blocks in succession from the sandwiching machine to the cutting device, an enrober, and further conveying means for feeding the wafer sandwiches from the cutting device to the enrober.

6. In apparatus according to claim 5, in which a batcher is provided between the cutting device and the enrober for forming the wafer sandwiches into batches prior to enrobing.

References Cited in the file of this patent

UNITED STATES PATENTS

| | | |
|---|---|---|
| 512,377 | Hooper | Jan. 9, 1894 |
| 562,534 | Hollingsworth | Jan. 23, 1896 |
| 1,164,566 | Aunes | Dec. 14, 1915 |
| 1,379,987 | Israel | May 31, 1921 |
| 1,575,207 | Hungerford | Mar. 2, 1926 |
| 1,606,721 | Rihl | Nov. 9, 1926 |
| 1,627,577 | Salerno | May 10, 1927 |
| 1,973,195 | Ankcorn | Sept. 11, 1934 |
| 2,198,726 | Shwom et al. | Apr. 30, 1940 |
| 2,520,493 | Curlee | Aug. 29, 1950 |
| 2,612,852 | Morrison | Oct. 7, 1952 |
| 2,660,961 | Neutelings | Dec. 1, 1953 |
| 2,817,306 | Oakes | Dec. 24, 1957 |

FOREIGN PATENTS

| | | |
|---|---|---|
| 456,989 | Germany | Mar. 6, 1928 |
| 512,377 | Germany | Nov. 10, 1930 |